UNITED STATES PATENT OFFICE.

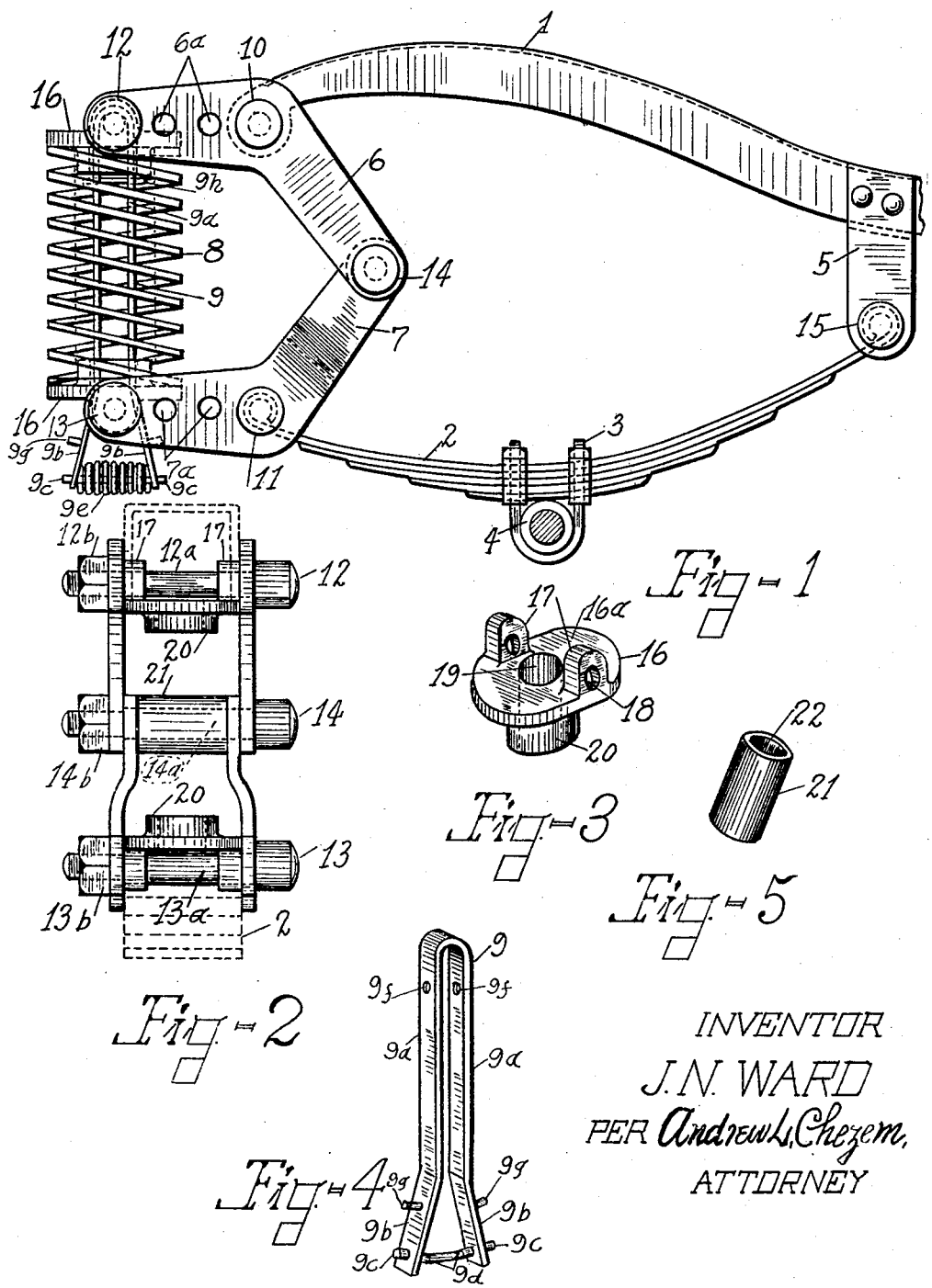

JAMES N. WARD, OF DAVENPORT, IOWA, ASSIGNOR OF ONE-FOURTH TO L. M. RECK AND ONE-FOURTH TO HENRY BURRMANN, BOTH OF DAVENPORT, IOWA.

SHOCK-ABSORBER FOR VEHICLES.

1,323,207.     Specification of Letters Patent.     Patented Nov. 25, 1919.

Application filed September 2, 1919. Serial No. 321,143.

*To all whom it may concern:*

Be it known that I, JAMES N. WARD, a citizen of the United States, residing at Davenport, in the county of Scott and State of Iowa, have invented a new and useful Shock-Absorber for Vehicles, of which the following is a specification.

My invention relates to improvements in shock absorbers combining the lever and spring principles with the snubber principle, by which the parts of the vehicle attached are made to act as the fulcrum in a double lever, and the recoil of the shock is averted by snubbing levers operated by a recoil spring, and the objects of my invention are to provide a shock absorber in which the weight is always neutral, the fulcrum shifts the weight, and the power is left free to control and equalize the opposing motions, and the recoil is overcome, regardless of whether the shock comes above or below.

A further object of my invention is to provide a mechanism by which the shock is principally absorbed before it hits the spring and frame of the vehicle.

A further object is to provide a shock absorber which grasps the shock at its zenith and so controls the recoil as to release it gently, thus entirely breaking the force of the shock.

A further object is to provide a shock absorber capable of being adjusted to any sized parts.

A further object of my invention is to provide a shock absorber in which a single machine may be adjusted to any sized vehicle, having the same sized spring, or to heavier loads in the same vehicle.

A further object of my invention is to provide means whereby the same spring in the shock absorber may be used by adjustment upon vehicles of different weights.

A further object is to provide a shock absorber in which no parts are removed from the machine except the shackle, and no mutilation of frame or springs occur, and by removing the shock absorber and replacing the shackle the machine is instantly restored to its manufactured condition.

A further object is to provide a thoroughly efficient shock absorber, simple of construction, easy to apply, and economic of cost and manufacture.

I attain these objects by the mechanism illustrated in the accompanying drawing, hereto attached, in which:—

Figure 1, is a side elevation of the shock absorber mounted on a machine, all parts in position.

Fig. 2, is an end view of the shock absorber showing machine parts in dotted lines attached, the shock absorber, spring, and safety strap link, removed.

Fig. 3, is a perspective view of a spring cap.

Fig. 4, is a perspective view of a combined spring retainer, and snubbing lever.

Fig. 5, is a perspective view of a spacer.

Similar letters refer to similar parts throughout the several views.

The basic parts of this shock absorber are the flat levers 6 and 7, the coil spring 8, the spring caps 16, the spacer 21, the safety strap link 9, and the bolt means by which the several parts are held together.

The flat lever 6 is a metal bar centrally angulated to each end to respective angles of about forty-five degrees, each angulated part approximately equaling its opposing part in length, each having circular holes in the center or angular point and at each end of the angulated part, and with its counter part, forms the upper pair of levers.

The flat lever 7 is the exact duplicate of flat lever 6, excepting one angulated part of one is bent laterally to the right, and of the other is bent laterally to the left, approximately mid-way between the center and the end, and with its counter part forms the lower pair of levers, each being of equal length and having respectively circular holes in their centers and end points.

In mounting levers 6 and 7 in pairs together, the bent ends of levers 7 are respectively oppositely placed between the ends of levers 6, and spaced apart by spacer 21, which is a tube of suitable length and of diameter suitable to be fitted upon connecting bolt 14, when connecting bolt 14 is inserted through the alined end holes, not shown, of levers 6, the spacer 22 and of levers 7, also not shown, and secured therein by ordinary screw thread and nut means 14$^b$, thus pivotally connecting the lever ends of each angulated pair of levers.

I next insert between each respective pair the prepared naked end parts of the mounting, and insert through the central alined holes (not shown) of the levers, alined with the holes in the ends of the respective machine parts 1 and 2 and insert the ordinary bolts 10 and 11, and secure the same by screw thread nut means (not shown).

I provide a spiral spring 8, in the respective ends of which I mount by inserting within the respective ends of the coil, the journaled end 20, of spring cap 16, the said spring cap 16 also having a journaled body 20, flanged top 16ª, ears 17 mounted thereon, the ears being provided with boxings 18 for insertion of bolt means 12 and 13, said cap being also centrally provided with a boxing 19 for insertion of combined safety link and snubbing lever Fig. 4.

It will be observed that bolt means 12 and 13 pass connectedly through the respective end holes (not shown) in levers, pairs 6 and 7, and safety link 9, and ear holes 18, in their respective regular orders, and are secured thereto by nut means 12ᵇ and 13ᵇ, by means of screw threads (not shown).

Centrally imposed within spiral spring 8, and mounted upon bolt 12, at its top and passing downwardly through boxing 19 of spring caps 16, its parts passing respectively on either side of bolt 13, is mounted the combined spring retainer and snubbing lever Fig. 4, being an oblong double-pronged flat fork, the part 9 forming its connecting head and is held fixedly mounted on bolt 12 by cotter pin 9ʰ inserted through hole 9ᶠ through its respective prongs, so that part 9 comprises its head, and 9ᵃ its respective prongs, such parts being that part intended as the spring retainer when referring to coil spring 8 mounted between the ends of lever 6 and 7, its upward movements within spring caps 16 being limited by lever stop 9ᵍ, its lower diverging end prongs 9ᵇ being for the purpose of mounting between them, by slide bolt means 9ᶜ and 9ᵈ of spiral spring 9ᵉ, the boss end 9ᶜ being for the purpose of operating as a spreader for 9ᵇ, each being wholly for the purpose of mounting and operating said spiral spring 9ᵉ between diverging end prongs 9ᵇ, and in operation it is intended that as the load, by reason of the shock, forces bolts 12 and 13 in closer proximity to each other compressing spiral spring 8, the said spring retainer and snubbing lever Fig. 4 is forced downward through boxing 19 of spring cap 16 and the said end prongs 9ᵇ are thus spread apart by the release of spiral spring 9ᵉ, so that when the recoil takes place its force is checked by the labored reclosing of end prongs 9ᵇ against spiral spring 9ᵉ mounted between them, and the boxing 19 of spring cap 16 tardily receives the upward return of the closing end prongs 9ᵇ.

In the non-pivotal ends of angulated levers 6 and 7, suitably spaced between the central perforations (not shown) through which bolts 10 and 11 are inserted, and the extreme perforations (not shown) through which bolts 12 and 13 are inserted, I provide other perforations 6ª and 7ª for the purpose of providing means of securing the parts by bolt and nut means 12 and 13, when adjusting the shock absorber by moving spiral spring 8, and spring caps 16, and spring retainer 9, inwardly as desired to adjust the machine to vehicles of different weights and capacities, and to adjust the same to lighter or heavier loads in the same vehicle.

I claim:—

1. A shock absorber consisting of two pairs of appositely arranged flat angulated levers pivotally connected at one end by bolt means, the pairs held separately in apposition by a spacer mounted on a bolt, at their pivotal ends; bolt means connectedly inserted through each pair at their angulate centers; other bolt means connectedly inserted through each pair at their non-pivotal extremities, such bolt means supporting suspendedly between such non-pivotal extremities of each pair, successively mounted, a combined spring retainer and snubber lever, a spring cap, and a spiral spring; extended diverging prong members; a spring member suspended by slide bolt means, between such diverging prong members; stop pin means attached upon the outward surfaces of diverging prong members.

2. A shock absorber having two pairs of flat centrally angulated levers, each pair pivotally joined at one end; one member of each pair having a plurality of holes between its non-pivotal end and its angulated center; one pair having its pivotal ends laterally bent toward each other to form a union with the other pair, its other non-pivotal ends and angulated center operating parallel with each other; spring means mounted by spring caps and secured by bolt means on the non-pivotal ends of said lever means so as to operate between them; spiral spring means mounted by spring caps inclosing a combined spring retainer and snubbing lever attached by bolt means at its head, its prong members extending protrudingly therethrough; diverging ends of such combined spring retainer and snubbing lever means having slide bolt means operating conjointly through them, supporting thereon between them spiral spring means; stop boss means on the outward portion of such extended prongs of said combined spring retainer and snubbing levers; all for the purpose specified.

JAMES N. WARD.

Witnesses:
 L. M. RECK,
 HENRY BURRMANN.